Oct. 17, 1967  B. R. BARKAN  3,347,060
COLLAPSIBLE, PORTABLE FREEZER BOX
Filed Dec. 22, 1965
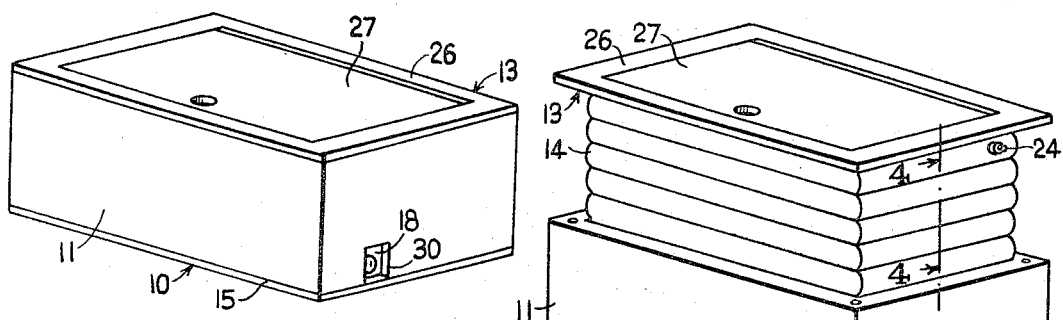
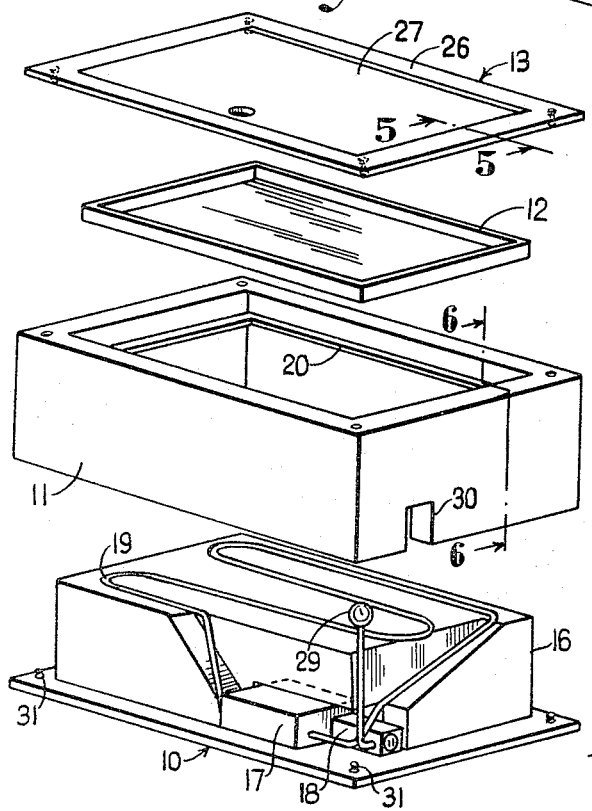
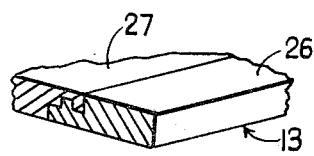
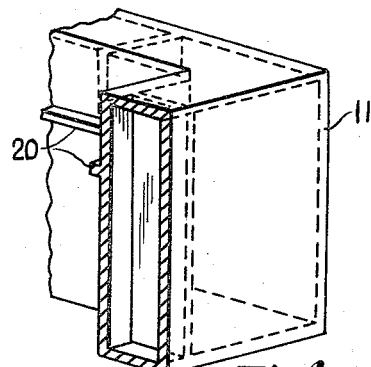
INVENTOR
*Bernard R. Barkan.*

United States Patent Office 3,347,060
Patented Oct. 17, 1967

3,347,060
COLLAPSIBLE, PORTABLE FREEZER BOX
Bernard R. Barkan, Leavenworth, Kans.
(2953 S. Keeley Ave., Chicago, Ill. 60608)
Filed Dec. 22, 1965, Ser. No. 515,654
6 Claims. (Cl. 62—457)

This invention relates to refrigeration, and more particularly to a portable refrigerated container.

While there have been any number of portable refrigerators made from time to time, some of which have been placed on the consumer market, none, insofar as this inventor knows, have been produced that are not only portable, but also collapsible in height in order that the refrigerator, which in this instance I personally call a freezer box, is no higher than need be necessary for the amount of food or the like that is placed therein.

It is obvious from the above remarks that the principal object of this invention is to provide a collapsible, portable freezer box that is not only portable, but is also automatically adjustable in height according to the amount of food or the like that is placed therein.

Another object of this invention is to provide a collapsible, portable freezer box that is specially adaptable for use by fruit pickers since the device can be placed by their side when picking fruit which is placed directly in the freezer box, thus eliminating the use of a separate transfer container having ice therein from which the fruit is removed to a refrigerated truck or car for transportation to the market or cold storage warehouse.

Still another object of this invention is to provide a collapsible portable freezer box that has its freezing apparatus activated by either electric batteries or some easily plugged in source of electric current.

Other and further objects and advantages of this invention will become apparent as the description of this invention is read in connection with an examination of the accompanying drawing in which:

FIG. 1 is a pictorial view of this invention in its collapsed position.

FIG. 2 is a pictorial view of this invention in its expanded position.

FIG. 3 is an exploded pictorial view showing the major parts of this invention.

FIG. 4 is a pictorial sectional view of this invention taken along line 4—4 of FIGURE 2 and viewed in the direction indicated by the arrows.

FIG. 5 is a pictorial sectional view of this invention taken along line 5—5 of FIGURE 3 and viewed in the direction indicated by the arrows.

FIG. 6 is a pictorial sectional view of this invention taken along line 6—6 of FIGURE 3 and viewed in the direction indicated by the arrows.

Looking now at the accompanying drawing, it will be seen that this invention consists of five major parts, namely, the base 10, the hollow encircling box 11, the tray 12 and the top 13, all of which are clearly illustrated in FIGURE 3, while the fifth major part of the invention, namely, the bellows 14 that forms the sides and ends of this invention, as will hereinafter be described and which is best shown in FIGURE 4 of the drawing.

Looking once more at FIGURE 3 of the drawing, it will be seen that the aforesaid base 10 consists of a flat rectangular member 15 on top of which is suitably secured a rectangular block of cellular polystyrene 16 that is recessed in order to receive the refrigeration unit 17 as well as the electric batteries 18 or their equivalent. The refrigeration tubing 19 that is, of course, connected to the aforesaid refrigeration unit 17 is located directly on top of the aforesaid block of cellular polystyrene 16. The previously mentioned hollow encircling box 11 is provided with an integrally formed internal ledge 20 that rests directly above the aforesaid refrigeration tubing 19 when this invention is assembled, while the underside of the tray 12 in turn rests upon the upper surface of the same ledge 20. It is in this tray, of course, that the fruit or other food is placed when this novel invention is in actual use.

Directing one's attention now to FIGURES 2 and 4, it will be seen that the previously mentioned bellows 14 consists of a plurality of vertically disposed and integrally connected tubes 21 that are separated from one another by the member 22 in which is located the air escape opening 23 that will permit air to flow from one tube to another tube as the bellows is expanded by air entering the valve 24 from any desired source, such as a pump or a compressed air line. A horizontally disposed U-shaped member 25 is integrally formed with the upper portion of the top one of the tubes 21 in order to provide a means of securement of the upper edge of the bellows to the underside of the rectangular frame 26 that goes to make up the top 13 which consists of not only the aforesaid frame 26 but also of the lid 27. A vertically disposed U-shaped member 28 projects downward from the lowermost one of the aforesaid members 22 of the bellows 14, thereby providing a means of attachment for the lower end of the bellows to the aforesaid hollow box 11. Glue, or some other bonding material, is actually used to secure the bellows 14 to the top 13 and the box 11 when this invention is assembled.

It is obvious from the above described invention of a collapsible, portable freezer box that I have provided a container in which fruit, vegetables, or in fact any food or the like, may be placed on its tray 12 after the invention has been assembled and the refrigeration unit 17 has been activated by either the electric batteries or their equivalent. The freezer box may then be transported to another place and its contents removed in perfectly fresh condition. Without the use of this invention the fruit, vegetables or other food would have had to be packed in ice and handled a number of times which would have not only been costly insofar as the many containers and ice are concerned, but also costly in the amount of manpower that would be required to handle what could not help but be a limited amount of the fruit, vegetables or other food products. Since the sides and ends of this invention consist of a bellows 14 which is blown up by air through the previously mentioned valve 24, the amount of foodstuffs placed in the freezer box is only limited by the height of the bellows. Obviously when there is little foodstuffs to be transported in this invention, the height of the invention will be small and therefore the device will take up a minimum amount of room in a truck or the like. Furthermore, the efficiency of the freezer box will always be maximum since the cubic contents of the box to be kept cool will only be that which is actually occupied by the foodstuffs, and the refrigeration unit 17 will not be cooling a lot of empty and unused space in the box. A thermostat 29 is connected in the refrigeration mechanism in a manner that will keep the temperature within the confines of the freezer box at a predetermined degree of coolness. Should the aforesaid electric batteries 18 be of the rechargeable type, or should they be replaced by some other device that will require an electric cord connection with an external source of power, then the cord can be connected to the batteries or their equivalent through the inverted U-shaped opening 30 that is in one end of the aforesaid hollow encircling box 11. Although it is shown in the accompanying drawing, it has not previously been stated that the aforesaid block of cellular polystyrene 16 is held down onto the aforesaid flat rectangular member 15 by the previously mentioned internal ledge 20 of the hollow encircling box 11 which is secured to the aforesaid rectangular member 15 by means of snap fasteners 31. Similar snap fasteners secure the aforesaid top 13 to the upper surface of the hollow encircling box 11 when the bellows 14 is completely collapsed.

It is to be understood that changes and modifications may be made in this invention and its details of construction in so long as the changes and modifications fall within the scope and intent of the appended claims.

What I now claim as new and desire to secure by Letters Patent is:

1. A collapsible, portable freezer box of the character described, comprising a refrigeration unit encircled by structure supporting a tray on which is placed anything that one desires to preserve by refrigeration, and a hollow collapsible encircling structure which is encircled by the first mentioned encircling structure and extending upward from the first mentioned structure and having a top thereon in which is a lid through which material may be placed in the said freezer box, said top being of a size to cover the first encircling member when the hollow collapsible structure is collapsed, and means of activating the said refrigeration unit and means of extending the height of the said collapsible structure.

2. The invention recited in claim 1 wherein the refrigeration unit is connected to refrigeration tubing that rests on top of a block of cellular polystyrene.

3. The invention recited in claim 2 wherein the said block of cellular polystyrene rests on a flat member and is encircled by the first mentioned structure which is a hollow box to the upper portion of which is secured the lower portion of the said collapsible structure which is in the form of a bellows.

4. The invention recited in claim 3 wherein the said tray rests on an internal ledge that is integral with the said hollow box, the underside of the said ledge resting on top of the said refrigeration tubing.

5. The invention recited in claim 4 wherein the means of activating the said refrigeration unit is by an electric battery or its equivalent that may if desired be of the rechargeable type, the said battery being located on top of the said flat member.

6. The invention recited in claim 5 wherein the means of extending the height of the said bellows is by air forced in the said bellows under pressure, the said bellows consisting of a plurality of horizontally disposed tubes one on top of the other and all of the said tubes being integral with one another and having openings therein for the air to flow from one tube to another.

References Cited

UNITED STATES PATENTS

| | | | |
|---|---|---|---|
| 2,532,234 | 11/1950 | Kimble | 62—457 X |
| 2,536,287 | 1/1951 | Higgins et al. | 62—457 |
| 2,612,761 | 10/1952 | Hilker | 62—457 |
| 2,886,084 | 5/1959 | Davison | 150—.5 |
| 2,926,504 | 3/1960 | Hellinger | 62—457 X |
| 3,001,380 | 9/1961 | Ramey | 62—457 X |
| 3,018,638 | 1/1962 | Winkler | 62—457 X |

FOREIGN PATENTS 857,499 12/1960 Great Britain.

LLOYD L. KING, *Primary Examiner.*